(12) United States Patent
Yamaguchi et al.

(10) Patent No.: US 8,577,500 B2
(45) Date of Patent: Nov. 5, 2013

(54) ROBOT APPARATUS, POSITION DETECTING DEVICE, POSITION DETECTING PROGRAM, AND POSITION DETECTING METHOD

(75) Inventors: Yukihiro Yamaguchi, Sendai (JP); Shingo Kagami, Sendai (JP); Kenji Matsunaga, Sendai (JP); Koichi Hashimoto, Sendai (JP)

(73) Assignee: Seiko Epson Corporation (JP)

( * ) Notice: Subject to any disclaimer, the term of this patent is extended or adjusted under 35 U.S.C. 154(b) by 88 days.

(21) Appl. No.: 13/368,741

(22) Filed: Feb. 8, 2012

(65) Prior Publication Data

US 2012/0209429 A1 Aug. 16, 2012

(30) Foreign Application Priority Data

Feb. 10, 2011 (JP) ................................. 2011-027233

(51) Int. Cl.
*G05B 19/00* (2006.01)
*G06K 9/40* (2006.01)
*G06K 9/32* (2006.01)

(52) U.S. Cl.
USPC ........................... 700/259; 382/266; 382/299

(58) Field of Classification Search
USPC .......................................................... 700/259
See application file for complete search history.

(56) References Cited

U.S. PATENT DOCUMENTS

| | | | |
|---|---|---|---|
| 6,434,279 B1 | 8/2002 | Shiba | |
| 7,391,931 B2 | 6/2008 | Kameyama et al. | |
| 7,408,988 B2 | 8/2008 | Linzer et al. | |
| 7,787,655 B1 * | 8/2010 | Cohen | 382/103 |
| 2004/0005082 A1 * | 1/2004 | Lee et al. | 382/103 |
| 2007/0120977 A1 * | 5/2007 | Duquette et al. | 348/87 |
| 2008/0002871 A1 * | 1/2008 | Gunzert-Marx et al. | 382/132 |
| 2009/0079876 A1 | 3/2009 | Takeshima et al. | |

FOREIGN PATENT DOCUMENTS

| | | |
|---|---|---|
| JP | 11-345315 | 12/1999 |
| JP | 2003-030669 | 1/2003 |
| JP | 2004-236291 | 8/2004 |
| JP | 2006-039628 | 2/2006 |
| JP | 2008-065530 | 3/2008 |
| JP | 2009-081734 | 4/2009 |
| JP | 2009-294170 | 12/2009 |
| JP | 2010-033231 | 2/2010 |
| JP | 2010-081634 | 4/2010 |

OTHER PUBLICATIONS

Shimizu, Masao et al., "Significance and Attributes of Sub-Pixel Estimation on Area-Based Matching", Institute of Electronics, Information, and Communication Engineers, NII-Electronic Library Service, D-II vol. J85-D-II, No. 12, pp. 1791-1800, (Dec. 2002).

* cited by examiner

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

A robot apparatus includes: an image pickup device; a goal-image storing unit that stores, according to sensitivity represented by an amount of change of a pixel value at the time when a target aligned with a goal position on an image at a pixel level is displaced by a displacement amount at a sub-pixel level, goal image data in a state in which the target is arranged; and a target detecting unit that calculates a coincident evaluation value of the target on the basis of comparison of image data including the target and the goal image data stored by the goal-image storing unit and detects positional deviation of the target with respect to the goal position on the basis of the coincidence evaluation value.

10 Claims, 11 Drawing Sheets

ROBOT APPARATUS, POSITION DETECTING DEVICE, POSITION DETECTING PROGRAM, AND POSITION DETECTING METHOD

BACKGROUND

1. Technical Field

The present invention relates to a robot apparatus, a position detecting device, a position detecting program, and a position detecting method.

2. Related Art

In a manufacturing process for an electronic apparatus, most of work in assembly is automated. In this automated manufacturing line, for example, an assembly robot grips and conveys objects such as a single component and an assembly component and assembles an electronic apparatus according to visual feedback control based on a picked-up image picked up by an image pickup device. In this automatic assembly by the visual feedback control, for example, when an object is a precision component or a component having a fine shape, in some case, it is necessary to detect the object at accuracy higher than position detection accuracy determined by pixel resolution indicating the performance of the resolution of the image pickup device.

In the past, a sub-pixel estimation technique is known as a technique for detecting the position of an object at accuracy higher than position accuracy determined by the pixel resolution of an image pickup device. For example, there is known a method of estimating the position of an object at a sub-pixel level by fitting-interpolating a coincidence evaluation value calculated at a pixel level (see, for example, Masao Shimizu and Masatoshi Okutomi, "Meaning and Characteristics of sub-pixel estimation in matching of images", The Institute of Electronics, Information and Communication Engineers Transaction D-II, December 2002, Vol. J85-D-II, No. 12, pp. 1791-1800 (Non-Patent Document 1).

However, since the method is estimation based on the coincidence evaluation value calculated at the pixel level, an error due to the estimation occurs. As the pixel resolution falls, the estimation error increase and a position error also increases.

SUMMARY

An advantage of some aspects of the invention is to provide a robot apparatus, a position detecting device, a position detecting program, and a position detecting method for highly accurately performing position detection for a target at a sub-pixel level.

[1] An aspect of the invention is directed to a robot apparatus including: a conveying robot that holds a target to be conveyable to a goal position; an image pickup unit that picks up an image of the goal position and the target included in a field of view and generates image data; a goal-image storing unit that stores, according to sensitivity represented by an amount of change of a pixel value at the time when the target aligned with the goal position in the image data at a pixel level is displaced by a displacement amount at a sub-pixel level, goal image data in a state in which the target is arranged; a target detecting unit that calculates a coincident evaluation value of the target on the basis of comparison of the image data including the image of the target, which is held by the conveying robot, generated by the image pickup unit and the goal image data stored by the goal-image storing unit and detects positional deviation of the target with respect to the goal position on the basis of the coincidence evaluation value; and a conveying-robot control unit that controls the conveying robot to convey the target held by the conveying robot in a direction in which the positional deviation detected by the target detecting unit is eliminated.

The robot apparatus according to the aspect conveys the target to the goal position according to visual feedback control. The robot apparatus according to the aspect realizes the visual feedback control by performing, in a state in which the target is caused to reach the goal position in advance, template matching processing for a goal image, which is a target picked-up image, and a target image, which is a picked-up image of the target, and performing feedback control. The coincidence evaluation value is, for example, a total sum of absolute values of luminance differences between a goal image and target images or a sum of squares of the luminance differences. The pixel value is, for example, a luminance value.

With this configuration, the robot apparatus can generate and store, for example, goal image data in a state in which the goal position of the target is a position where sensitivity is the highest. The robot apparatus calculates, while performing control for displacing the target with a displacement amount at the sub-pixel level, a coincidence evaluation value of the target of target images and a goal image and detects a point where the coincidence evaluation is the highest. The robot apparatus can cause the target to reach the goal position at precise sub-pixel accuracy by controlling the conveying robot to move the target to a position corresponding to the point.

[2] The robot apparatus explained in [1] above may be configured to further include: a position changing robot that changes relative positions on the image data of the target aligned in the goal position at the pixel level and the image pickup unit; a sensitivity-map generating unit that calculates a distribution of the sensitivity on the basis of image data including an image of the target displaced by the position changing robot and generates a sensitivity map in which the distribution is associated with a position on the image data; a goal-position determining unit that determines a goal position in the image data on the basis of the sensitivity map generated by the sensitivity-map generating unit; and a position-changing-robot control unit that controls the position changing robot to move the target to the goal position determined by the goal-position determining unit. When the target detecting unit detects the positional deviation, the target detecting unit calculates a direction and a deviation amount of the positional deviation of the target according to sub-pixel estimation processing. The conveying-robot control unit controls, on the basis of the direction and the deviation amount of the positional deviation of the target, the conveying robot to convey the target held by the conveying robot.

With this configuration, by generating the sensitivity map, it is possible to determine an appropriate goal position having high sensitivity according to the distribution of the sensitivity of the target image.

[3] The robot apparatus explained in [2] above may be configured such that the sensitivity-map generating unit weights pixels with a weight coefficient according to the sensitivity and associates the weight coefficient and the sensitivity map. The target detecting unit selects a pixel used for calculation processing for the coincidence evaluation value on the basis of the weight coefficient of the pixels.

With this configuration, by applying the weight coefficient corresponding to the sensitivity, it is possible to perform image comparison while suppressing the influence due to noise and a background image and perform highly reliable alignment at the sub-pixel level.

[4] The robot apparatus explained in [3] above may be configured such that the weight coefficient has a larger value as the sensitivity increases. The target detecting unit selects a pixel used for the calculation processing for the coincidence evaluation value using only pixels, the weight coefficient of which has a value exceeding a threshold.

[5] The robot apparatus explained in any of [1] to [4] above may be configured such that the target detecting unit calculates a total sum of absolute values of luminance differences between the image data and the goal image data or a sum of squares of the luminance differences and obtains the coincidence evaluation value.

[6] The robot apparatus explained in any of [1] to [5] above may be configured such that the conveying robot includes a movable arm section and a movable hand section coupled to the arm section and causes the hand section to hold the target.

[7] The robot apparatus explained in any of [2] to [6] explained above may be configured such that, in a state in which one of the target and the image pickup unit is fixed, the position changing robot movably supports the other.

[8] Another aspect of the invention is directed to a position detecting device including: a goal-image storing unit that stores, according to sensitivity represented by an amount of change of a pixel value at the time when a target aligned with a goal position in image data at a pixel level is displaced by a displacement amount at a sub-pixel level, goal image data in a state in which the target is arranged; and a target detecting unit that calculates a coincident evaluation value of the target on the basis of comparison of image data including an image of the target and the goal image data stored by the goal-image storing unit and detects positional deviation of the target with respect to the goal position on the basis of the coincidence evaluation value.

With this configuration, the position detecting device can generate and store, for example, goal image data in a state in which the goal position of the target is a position where sensitivity is the highest. The position detecting device calculates, while performing control for displacing the target with a displacement amount at the sub-pixel level, a coincidence evaluation value of the target of target images and a goal image. Therefore, the position detecting device can detect a point where the coincidence evaluation is the highest, i.e., detect the position of the target at precise sub-pixel accuracy.

[9] Still another aspect of the invention is directed to a position detecting program for causing a computer, which includes a goal-image storing unit that stores, according to sensitivity represented by an amount of change of a pixel value at the time when the target aligned with a goal position in image data at a pixel level is displaced by a displacement amount at a sub-pixel level, goal image data in a state in which the target is arranged, to execute: a calculation step of calculating a coincidence evaluation value of the target on the basis of comparison of image data including images of the target and the goal image data stored by the goal-image storing unit; and a detecting step of detecting positional deviation of the target with respect to the goal position on the basis of the calculated coincidence evaluation value.

[10] Yet another aspect of the invention is directed to a position detecting method including: a target detecting unit calculating, according to sensitivity represented by an amount of change of a pixel value at the time when a target aligned with a goal position in image data at a pixel level is displaced by a displacement amount at a sub-pixel level, a coincidence evaluation value of the target on the basis of comparison of goal image data in a state in which the target is arranged and image data including images of the target; and the target detecting unit detecting positional deviation of the target with respect to the goal position on the basis of the calculated coincidence evaluation value.

Therefore, according to the aspects of the invention, it is possible to highly accurately perform position detection of the target at the sub-pixel level.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention are explained in detail below with reference to the accompanying drawings.

First Embodiment

A robot apparatus according to a first embodiment of the invention is an apparatus that conveys a component (a target) to a goal position according to visual feedback control and performs assembly work for an assembly component. The goal position is a position set as a target of a component when the component is assembled with the assembly component.

The robot apparatus performs, in a state in which a component is arranged in a goal position in advance, in other words, a state in which a target is caused to reach the goal position, template matching processing of a picked-up image (a goal image) of the component or an alignment target region in the component and a picked-up image (a target image) of a component being conveyed and performs feedback control to thereby realize the visual feedback control.

The template matching processing is processing for comparing a target portion of a goal image and a target image to calculate a coincidence evaluation value and detecting the target from the target image on the basis of the coincidence evaluation value. The coincidence evaluation value is, for example, a total sum of absolute values of luminance differences between a goal image and target images or a sum of squares of the luminance differences.

In this embodiment, it is assumed that the target is an object smaller than a size represented by one pixel of an image pickup system, i.e., an object smaller than a size equivalent to one pixel. It is assumed that the target is, for example, a fine shaft hole of a spur gear, which is a precision component. The robot apparatus according to this embodiment generates and keeps a goal image in a state in which the target is aligned with the goal position at pixel accuracy (at a pixel level) and in a state in which the target is arranged in a position where a pixel value substantially changes when the target is finely moved at sub-pixel accuracy (at a sub-pixel level) (as explained in detail later, this position is referred to as position with high sensitivity). The robot apparatus performs tracking of the target at the pixel level and the sub-pixel level using the kept goal image.

Figure 1:
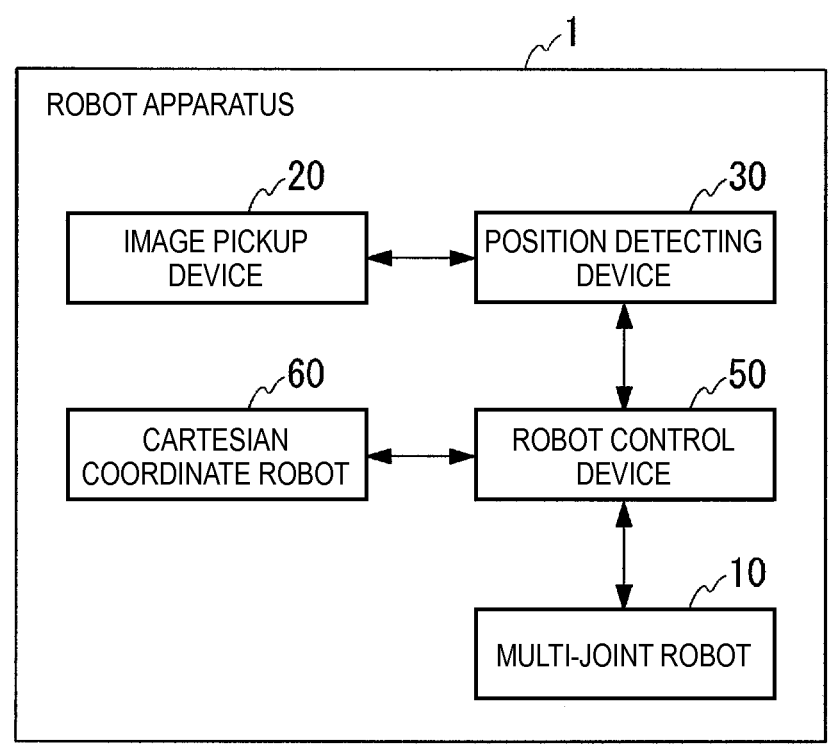
FIG. 1 is a block diagram showing a functional configuration of a robot apparatus according to a first embodiment of the invention.

FIG. 1 is a block diagram showing a functional configuration of the robot apparatus according to the first embodiment. As shown in FIG. 1, a robot apparatus 1 includes a multi-joint robot (a conveying robot) 10, an image pickup device (an image pickup unit) 20, a position detecting device 30, a robot control device (a conveying-robot control unit and a position-changing robot control unit) 50, and a Cartesian coordinate robot (a position changing robot) 60.

In order to highly accurately perform alignment of a target at the sub-pixel level, as explained above, the robot apparatus 1 generates and keeps a goal image in a state in which the target is arranged in a position with high sensitivity. In order to arrange the target in the position with high sensitivity, the robot apparatus 1 can move the position of the target with the Cartesian coordinate robot 60.

In the robot apparatus 1, the image pickup device 20 picks up an image of a component gripped by the multi-joint robot 10. The position detecting device 30 analyzes the picked-up image and detects the position of the target. The robot control device 50 controls, on the basis of the position of the target detected by the position detecting device 30, the multi-joint robot 10 to move the target to a goal position. The multi-joint robot 10 conveys a component corresponding to the target and assembles an assembly component according to the control by the robot control device 50.

The components of the robot apparatus 1 are explained.

Figure 2:
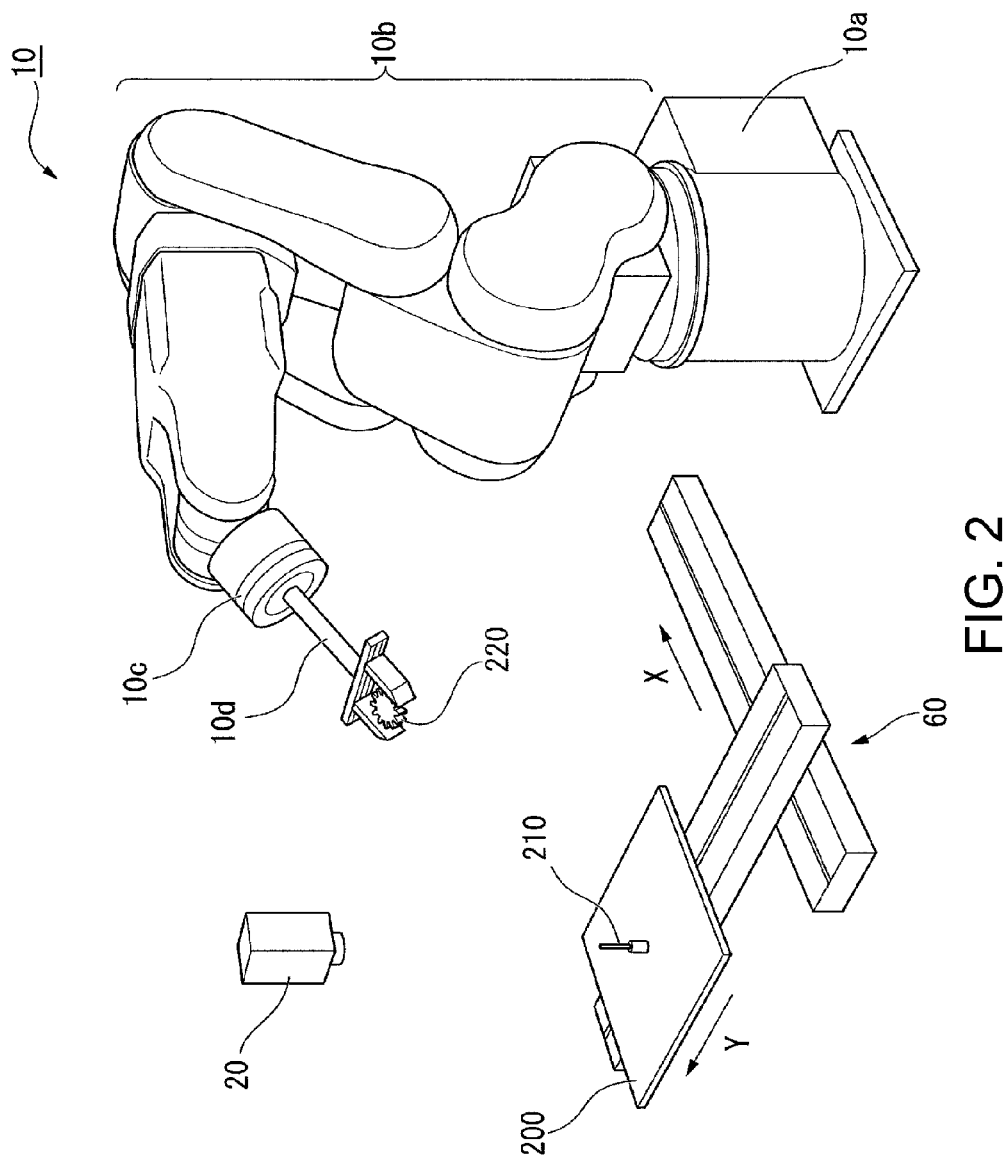
FIG. 2 is a diagram schematically showing a state in which a multi-joint robot in a robot apparatus set in an assembly and manufacture line of a factory is performing assembly work for an assembly component in the embodiment.

FIG. 2 is a diagram schematically showing a state in which the multi-joint robot 10 in the robot apparatus 1 set in an assembly and manufacture line of a factory is performing assembly work for an assembly component. In the assembly and manufacture line shown in FIG. 2, the multi-joint robot 10, the image pickup device 20, and the Cartesian coordinate robot 60 on which an assembly component being assembled is movably set in the robot apparatus 1 are set.

In FIG. 2, the position detecting device 30 and the robot control device 50 are not shown. Scales of the components, the structure, and the like in FIG. 2 are different from actual ones in order to clarify the figure (the same holds true in FIGS. 3 and 4 referred to later).

The multi-joint robot 10 includes a supporting platform 10a fixed to the ground, an arm section 10b coupled to the supporting platform 10a to be capable of turning and capable of bending and stretching, a hand section 10c coupled to the arm section 10b to be capable of pivoting and capable of swinging, a gripping section 10d attached to the hand section 10c. The multi-joint robot 10 is, for example, a six-axis vertical multi-joint robot. The multi-joint robot 10 has a degree of freedom of six axes according to coordinated movements of the supporting platform 10a, the arm section 10b, and the hand section 10c. The multi-joint robot 10 can freely change the position and the direction of a component gripped by the gripping section 10d. The multi-joint robot 10 moves, according to the control by the robot control device 50, any one of or a combination of the arm section 10b, the hand section 10c, and the gripping section 10d.

The degree of freedom of the multi-joint robot 10 is not limited to the degree of freedom by the six axes. The supporting platform 10a may be set in a place fixed to the ground such as the floor, the wall, or the ceiling.

The gripping section 10d of the multi-joint robot 10 grips a component 220. The component 220 is, for example, a precision component, which is a spur gear including a fine shaft hole. In this embodiment, as explained above, the spur gear including the fine shaft hole is indicated as a specific example of the component 220. The fine shaft hole of the spur gear is indicated as a specific example of the target.

The Cartesian coordinate robot 60 moves two shaft modules, which are movable in the respective directions of an X axis and a Y axis orthogonal in a plane, individually or in coordination with each other to thereby move an assembly component in the plane. The Cartesian coordinate robot 60 moves the shaft modules in the respective directions of the X axis and the Y axis according to the control by the robot control device 50.

The assembly component is a component in which a shaft 210 having an extra fine shaft diameter is provided on a base 200. The base 200 has a surface parallel to the horizontal plane in a state in which the base 200 is provided in the Cartesian coordinate robot 60. The shaft 210 is provided on the surface such that the axis direction thereof is perpendicular to the surface.

In the assembly and manufacture line shown in FIG. 2, the multi-joint robot 10 performs work for attaching the component 220 to the assembly component such that the shaft 210 of the assembly component pierces through the shaft hole of the component 220 (the spur gear).

The image pickup device 20 is a camera device that can pickup, for example, a still image or a moving image at a frame rate such as 30 frames/second (fps; frame per second). The image pickup device 20 is fixedly set, above the assembly component, in a position where an image pickup direction is vertically downward and an optical axis of a not-shown lens optical system substantially coincides with the center axis of the shaft 210. In FIG. 2, a structure and the like for fixing the image pickup device 20 are not shown.

The image pickup device 20 picks up images of the assembly component and the component 220 serving as subjects according to an image pickup request command supplied from the position detecting device 30 and supplies image data obtained by the image pickup to the position detecting device 30.

The position detecting device 30 includes a goal image generating function and a target detecting function.

The goal image generating function is a function of the position detecting device 30 for generating and storing, according to coordinated movements of the image pickup device 20, the robot control device 50, and the Cartesian coordinate robot 60, a goal image in a state in which the target is arranged in a position with high sensitivity.

The target detecting function is a function of the position detecting device 30 for performing, according to coordinated movements of the image pickup device 20, the robot control device 50, and the multi-joint robot 10, template matching processing for a goal image and a target image to thereby perform position detection of the target at the pixel level and perform position detection of the target at the sub-pixel level on the basis of a distribution of sensitivity. The position detecting device 30 performs the position detection at the pixel level when the position detecting device 30 is set in a rough adjustment mode and operates. The position detecting device 30 performs the position detection at the sub-pixel level when the position detecting device 30 is set in a fine adjustment mode and operates.

The position detecting device 30 is set in the fine adjustment mode and operates after being set in the rough adjustment mode and operating.

The rough adjustment mode is a mode of processing of the position detecting device 30 for detecting the target (the area of the shaft hole of the spur gear) and controlling to move a reference position of the target (the center position of the shaft hole of the spur gear) to a goal position, i.e., the position of the shaft center of the shaft 210.

The fine adjustment mode is a mode of processing of the position detecting device 30 for, in a state in which the position of the target coincides with the goal position at the pixel level, calculating a coincidence evaluation value of target images and a goal image while performing control for moving the target in a predetermined direction by a fine distance (a distance equivalent to a size smaller than one pixel) and controlling to move the target to a position corresponding to a highest value of coincidence evaluation.

The robot control device 50 captures a Cartesian coordinate robot control command supplied from the position detecting device 30 that executes goal image generation processing for realizing a goal image generating function. The robot control device 50 controls, on the basis of the Cartesian coordinate robot control command, the movement of one or both of the two shaft modules of the Cartesian coordinate robot 60. After controlling the Cartesian coordinate robot 60, the robot control device 50 acquires, from the Cartesian coordinate robot 60, a Cartesian coordinate robot control status including information indicating whether the control is successful and supplies the Cartesian coordinate robot control status to the position detecting device 30.

The robot control device 50 captures a multi-joint robot control command supplied from the position detecting device 30 that executes target detection processing for realizing a target detecting function. The robot control device 50 controls, on the basis of the multi-joint robot control command, the movement of any one of or a combination of the arm section 10b, the hand section 10c, and the gripping section 10d of the multi-joint robot 10. After controlling the multi-joint robot 10, the robot control device 50 acquires, from the multi-joint robot 10, a multi-joint robot control status including information indicating whether the control is successful and supplies the multi-joint robot control status to the position detecting device 30.

Figure 3:
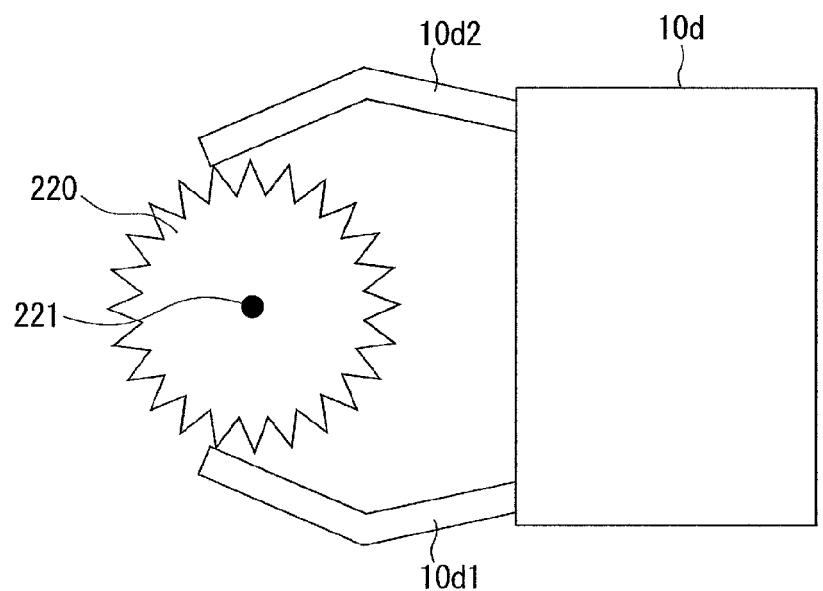
FIG. 3 is a schematic diagram of a distal end portion of a gripping section attached to the multi-joint robot and a component gripped by the gripping section viewed from an image pickup device side in the embodiment.

FIG. 3 is a schematic diagram of a distal end portion of the gripping section 10d attached to the multi-joint robot 10 and the component 220 (the spur gear) gripped by the gripping section 10d viewed from an axis direction piercing through the shaft hole of the spur gear, i.e., the image pickup device 20 side. As shown in FIG. 3, the gripping section 10d holds and grips the component 220 with a pair of claw sections 10d1 and 10d2 included in the gripping section 10d. When the component 220 is the spur gear, the gripping section 10d holds and grips teeth of the spur gear with the claw sections 10d1 and 10d2. In FIG. 3, the shaft hole 221 is the target.

Figure 4:
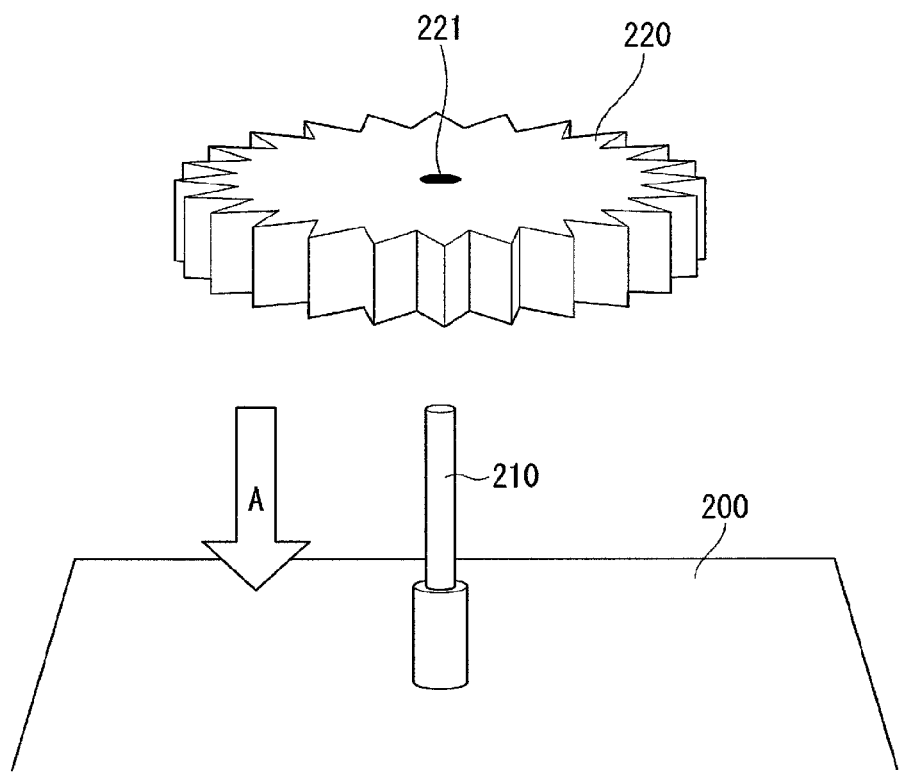
FIG. 4 is a diagram schematically showing a state in which a component is attached to a shaft of a base in the embodiment.

FIG. 4 is a diagram schematically showing a state in which the component 220 is attached to the shaft 210 of the base 200. In FIG. 4, the component 220 is gripped by the gripping section 10d. However, the gripping section 10d is not shown. As shown in FIG. 4, the component 220 is conveyed by the gripping section 10d to a position above the shaft 210 where the center axis of the shaft hole 221 coincides with the axis of the shaft 210 and then conveyed in an arrow A direction, which is a vertically downward direction, whereby the component 220 is attached to the base 200 with the shaft 210 pierced through the shaft hole 221.

The sensitivity of an image is explained. The sensitivity of an image is a degree of a change in a pixel value of a pixel corresponding to a target with respect to fine displacement of the position of the target in an image pickup surface. A fine displacement amount is a distance equivalent to a size smaller than one pixel in the image pickup surface.

The sensitivity of an image is explained in detail with reference to a specific example.

Figure 5A:
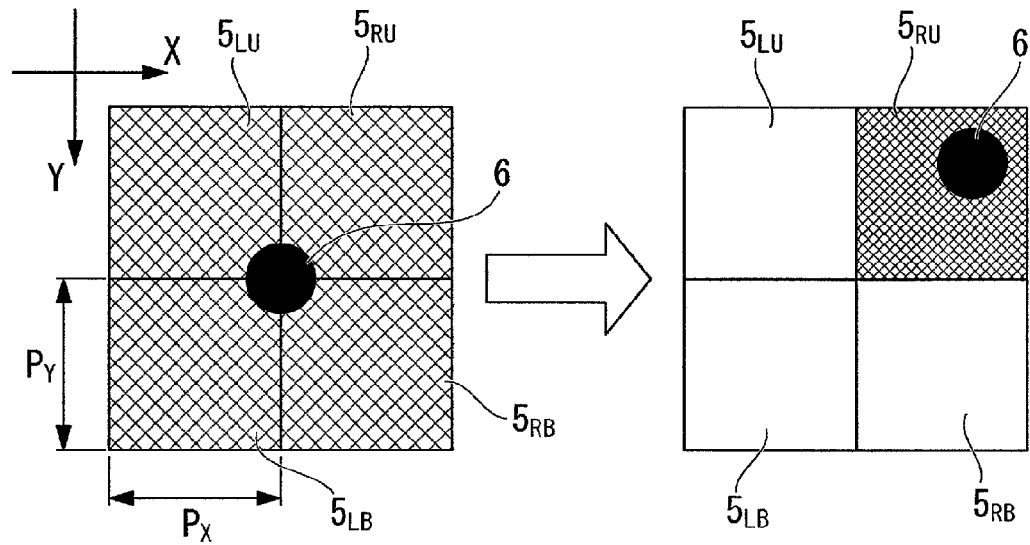
FIGS. 5A and 5B are diagrams for explaining the sensitivity of an image picked up when the size of a target is smaller than a size equivalent to one pixel of an image pickup system in the embodiment.
Figure 5B:
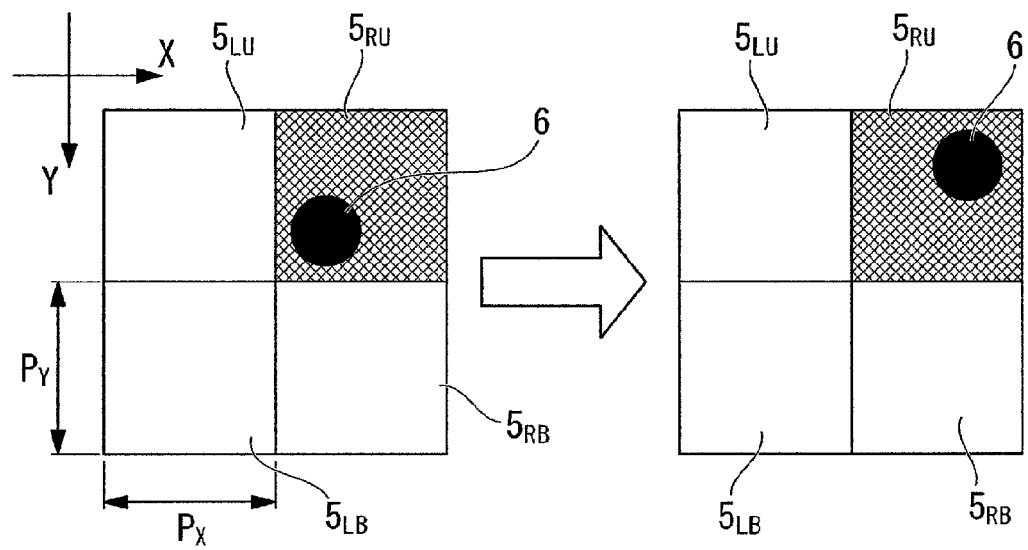

FIGS. 5A and 5B are diagrams for explaining the sensitivity of an image picked up when the size of a target is smaller than a size equivalent to one pixel of the image pickup system. FIGS. 5A and 5B are respectively diagrams in which a target 6 and pixels $5_{LU}$, $5_{RU}$, $5_{LB}$, and $5_{RB}$ including an image of the target 6 are schematically shown to be superimposed one on top of the other. As shown on the left side of FIG. 5A, when the target 6 is located to partially extend over all the pixels $5_{LU}$, $5_{RU}$, $5_{LB}$, and $5_{RB}$, the pixels $5_{LU}$, $5_{RU}$, $5_{LB}$, and $5_{RB}$ include an image component of the target 6. The image component is, for example, a luminance value. As shown in the right part in FIG. 5A, when the target 6 is displaced by a displacement amount equivalent to a size smaller than one pixel from the state explained above to be included in the pixel $5_{RU}$, image components of the pixels $5_{LU}$, $5_{RU}$, $5_{LB}$, and $5_{RB}$ change. The image component of the target 6 is not included in the pixels $5_{LU}$, $5_{LB}$, and $5_{RB}$ and is included in only the pixel $5_{RU}$. When a pixel value of a pixel included in an image corresponding to the target 6 substantially changes with respect to fine displacement of the target 6 in this way, the image before the fine displacement of the target 6 is referred to as image with high sensitivity and a position before the fine displacement of the image is referred to as position with high sensitivity.

As shown on the left side of FIG. 5B, when the target 6 is included only in the pixel $5_{RU}$ among the pixels $5_{LU}$, $5_{RU}$, $5_{LB}$, and $5_{RB}$, only the pixel $5_{RU}$ includes the image component of the target 6. As shown in the right part in FIG. 5B, when the target 6 is displaced by a displacement amount equivalent to a size smaller than one pixel from the state explained above not to be excluded from the pixel $5_{RU}$, all the image components of the pixels $5_{LU}$, $5_{RU}$, $5_{LB}$, and $5_{RB}$ do not change. When a pixel value of a pixel included in an image corresponding to the target 6 does not change or finely changes with respect to fine displacement of the target 6 in this way, the image before the fine displacement of the target 6 is referred to as image with low sensitivity and a position before the fine displacement of the image is referred to as position with low sensitivity.

The position detecting device 30 generates and stores a goal image in a state in which a goal position of a target is a position with high sensitivity. The position detecting device 30 calculates a coincidence evaluation value of target images and a goal image while performing control for moving an object by a displacement amount smaller than a distance equivalent to one pixel and detects, for example, a point where coincidence evaluation is the highest. The position detecting device 30 can cause the target to reach a goal at the sub-pixel level by controlling the robot control device 50 to move the target to a position corresponding to the point.

The alignment at the sub-pixel level is more specifically explained with reference to both FIGS. 6 and 7.

Figure 6:
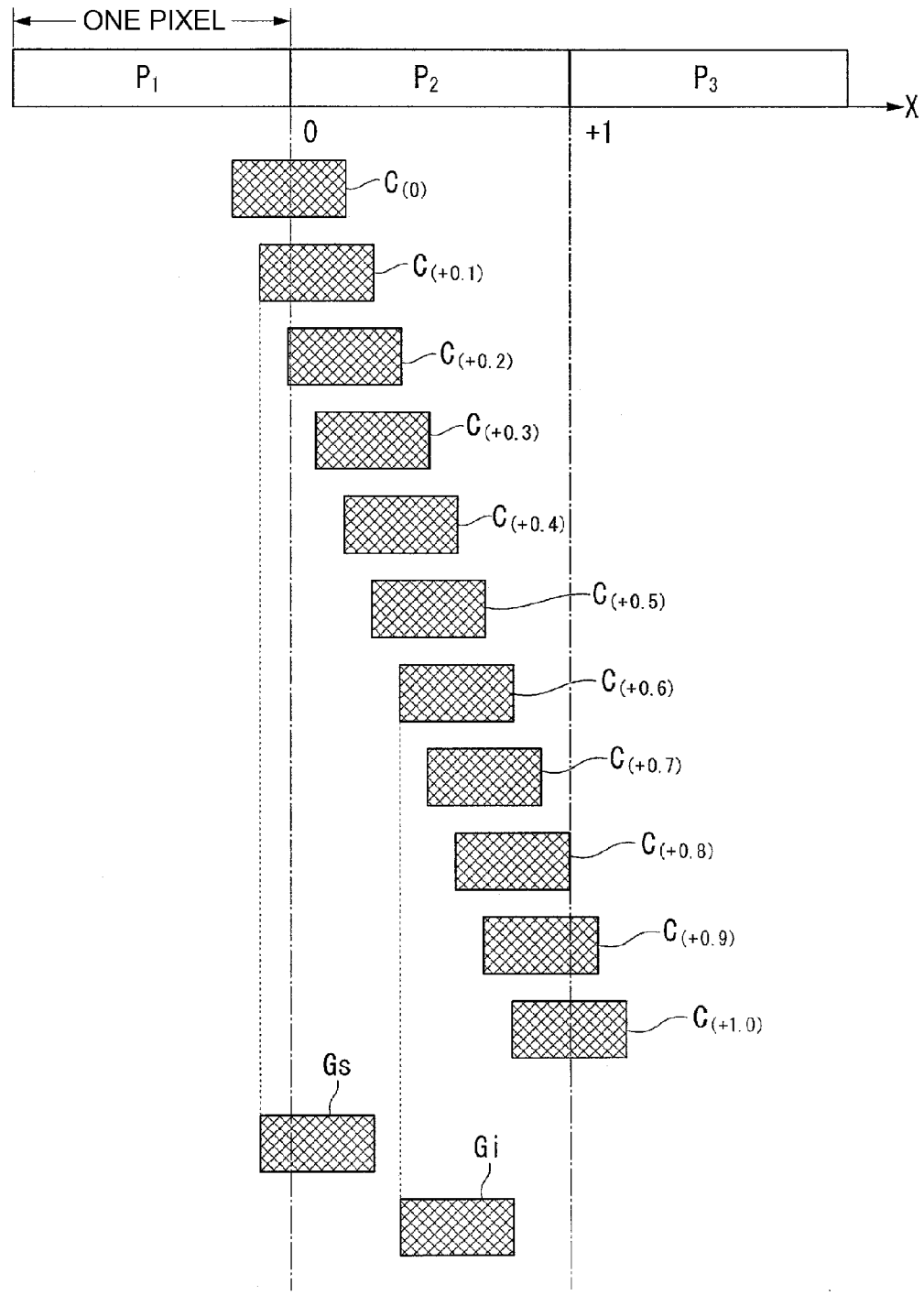
FIG. 6 is a diagram for explaining coincidence evaluation of the positions of the target finely moved at a sub-pixel level and a goal position in the embodiment.

FIG. 6 is a diagram for explaining coincidence evaluation of positions of the target finely moved at the sub-pixel level and a goal position. FIG. 6 one-dimensionally represents a pixel array for convenience of explanation. In FIG. 6, $P_1$, $P_2$, and $P_3$ represent pixels that continue in the X axis direction. $C_{(0)}$, $C_{(+0.1)}$, $C_{(+0.2)}$, . . . , $C_{(+0.9)}$, and $C_{(+1.0)}$ respectively represent positions of a target C (having a size equivalent to 0.4 pixel) moved from the position of $C_{(0)}$ (the position in the center of the target C coincides with a boundary position of the pixels $P_1$ and $P_2$) in a positive direction of the X axis by 0.1 pixel at a time. Both Gs and Gi represent goal positions of the target C. The goal position Gs is a position extending over the pixel $P_1$ and the pixel $P_2$ (a position in a range occupying 0.1 pixel of the pixel $P_1$ and 0.3 pixel of the pixel $P_2$). The goal position Gi is a position starting from a position shifted from the head of the pixel $P_2$ by 0.4 pixel, i.e., a position included in the pixel $P_2$.

In FIG. 6, the position of the target C coinciding with the goal position Gs is the position $C_{(+0.1)}$ and the position of the target C coinciding with the goal position Gi is the position $C_{(+0.6)}$.

Figure 7A:
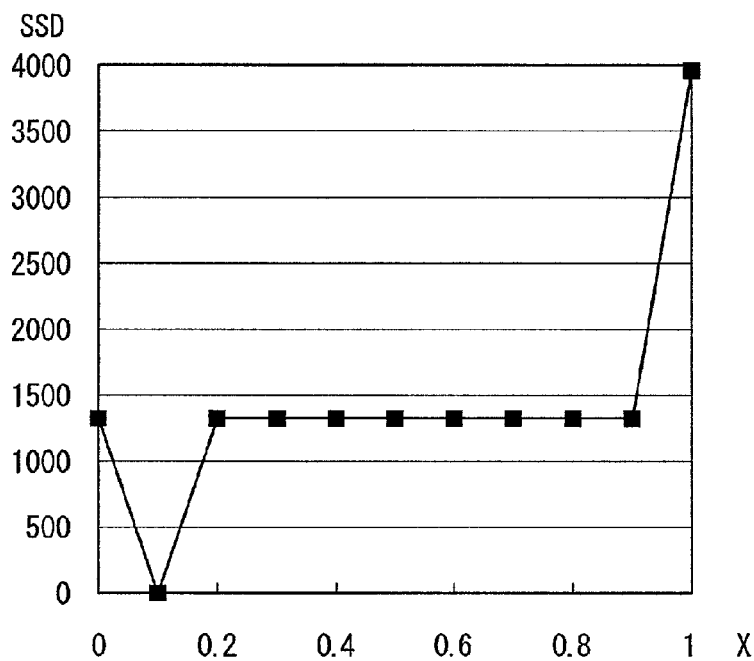
FIGS. 7A and 7B are graphs of coincidence evaluation values of a target image and a goal image associated with the positions of the target in FIG. 6.
Figure 7B:
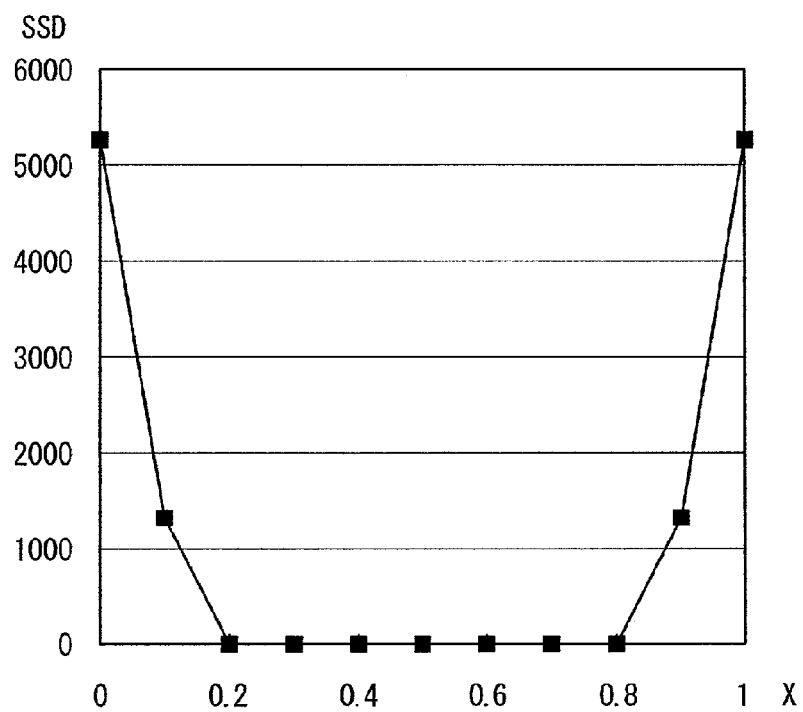

FIGS. 7A and 7B are graphs of coincidence evaluation values of a target image and a goal image associated with the positions of the target in FIG. 6. FIG. 7A is a graph representing a sum of squares of luminance differences (SSD; Sum of Squared Difference) between target images in the positions of the target C and a goal image in the goal position Gs. FIG. 7B is a graph representing a sum of squares of luminance differences between target images in the positions of the target C and a goal image in the goal position Gi.

In the graph of FIG. 7A, only a sum of squares of luminance differences between a target image at the time when the target C is in the position $C_{(+0.1)}$ and the goal image in the goal position Gs is 0 (zero). In other words, except the position $C_{(+0.1)}$ where the target C coincides with the goal position Gs, a sum of squares of luminance differences is a positive value. Coincidence evaluation is a highest evaluation point when a square sum of luminance differences is 0 (zero).

On the other hand, in the graph of FIG. 7B, a square sum of luminance values between targets images and the goal image in the goal position Gi is 0 (zero) from the position $C_{(+0.2)}$ to the position $C_{(+0.8)}$ where the target C is in a range equivalent to the pixel $P_2$. In other words, when an entire range of the target C is a part of the range equivalent to the pixel $P_2$, a position where the target C coincides with the goal position Gi cannot be specified.

Therefore, when a target is present in a position extending across adjacent pixels, alignment of a target image and a goal image can be accurately performed at the sub-pixel level.

The configuration of the position detecting device 30 is explained.

Figure 8:
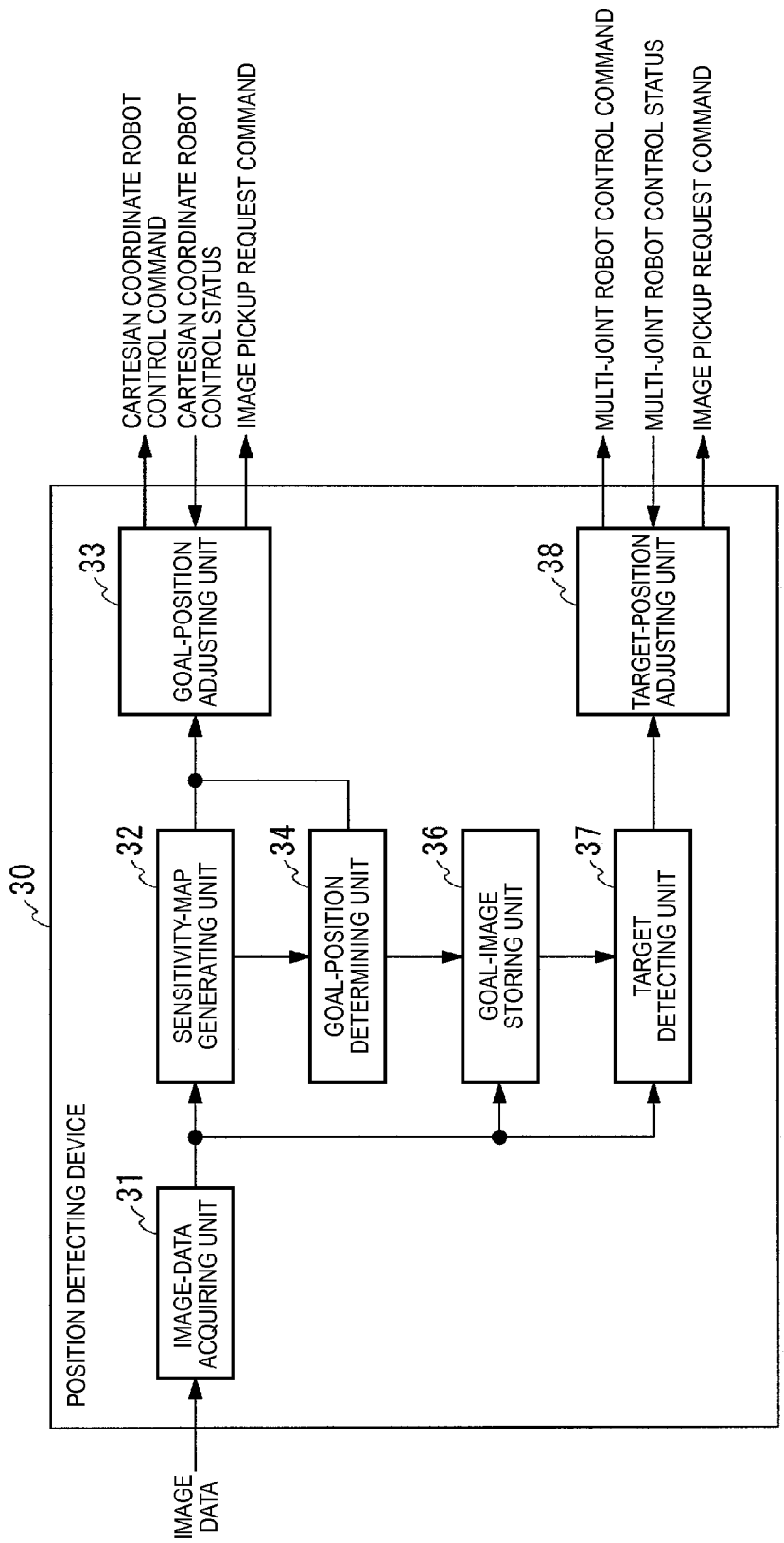
FIG. 8 is a block diagram showing a functional configuration of a position detecting device according to the embodiment.

FIG. 8 is a block diagram showing a functional configuration of the position detecting device 30. As shown in FIG. 8, the position detecting device 30 includes an image-data acquiring unit 31, a sensitivity-map generating unit 32, a goal-position adjusting unit 33, a goal-position determining unit 34, a goal-image storing unit 36, a target detecting unit 37, and a target-position adjusting unit 38.

In the execution of the goal image generation processing by the position detecting device 30, the image-data acquiring unit 31 captures image data of a still image supplied from the image pickup device 20 and supplies the image data to the sensitivity-map generating unit 32 and the goal-image storing unit 36. In the execution of the target detection processing by the position detecting device 30, the image-data acquiring unit 31 captures, in a frame unit, image data of a moving image supplied from the image pickup device 20 and supplies the image data to the target detecting unit 37.

In the execution of the goal image generation processing, the sensitivity-map generating unit 32 captures image data sequentially supplied from the image-data acquiring unit 31 and generates a sensitivity map on the basis of the image data. The sensitivity map represents, in association with positions on an image of a target arranged in a goal position coinciding with the target at the pixel level, the sensitivity of the image of the target at the time when the target is displaced stepwise (e.g., with a distance equivalent to 0.1 pixel set as a fine displacement amount) in predetermined directions, for example, the horizontal left direction, the horizontal right direction, the vertical upward direction, and the vertical downward direction. In other words, the sensitivity map represents a distribution of the sensitivity of a target image.

The sensitivity-map generating unit 32 supplies information concerning a moving direction and a moving amount of the target to the goal-position adjusting unit 33 in order to acquire, from the image-data acquiring unit 31, an image of the target finely displaced in the predetermined direction.

The sensitivity map is explained with reference to a specific example.

Figure 9:
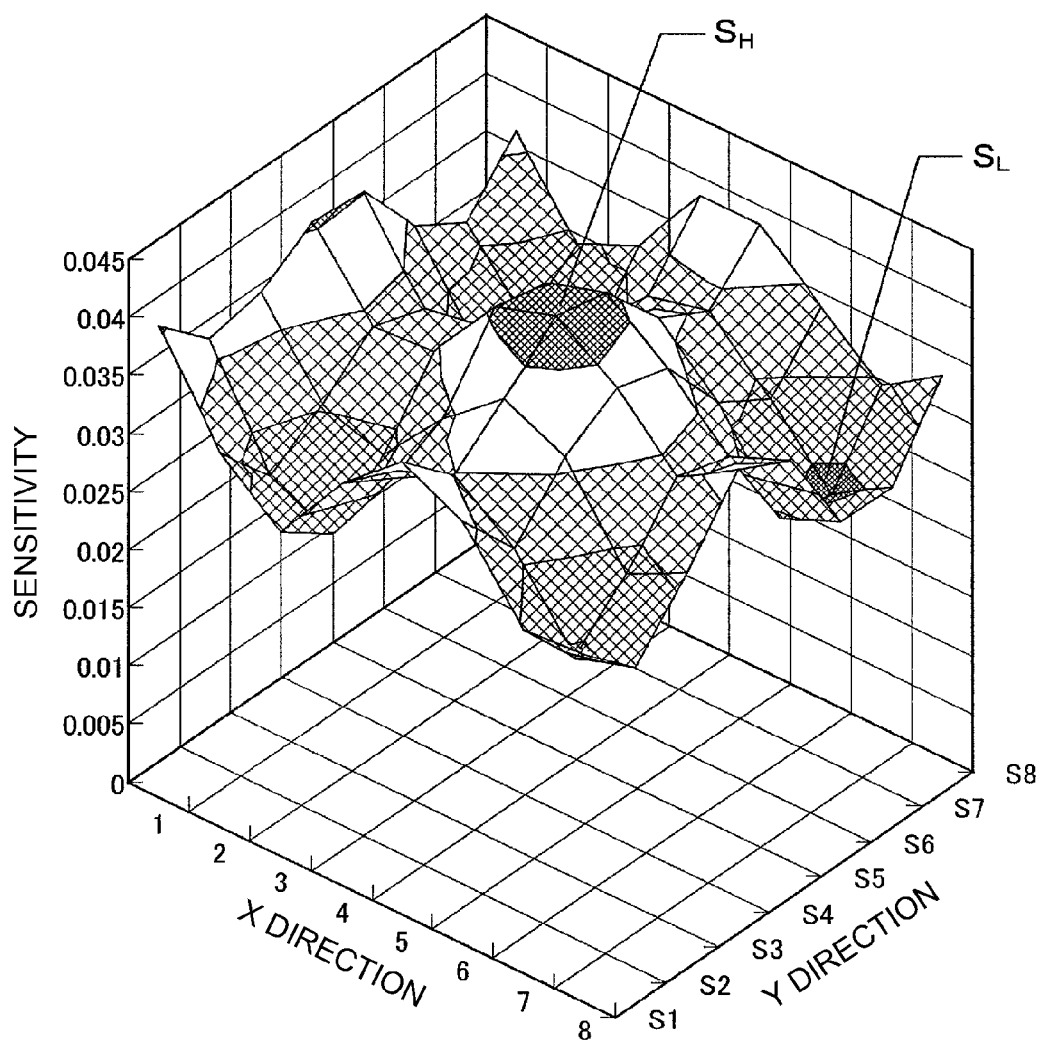
FIG. 9 is a diagram of a sensitivity map generated by a sensitivity-map generating unit in the embodiment.

FIG. 9 is an example of the sensitivity map generated by the sensitivity-map generating unit 32. The sensitivity map shown in FIG. 9 is obtained by tabulating average values of values of sensitivity (sensitivity values) calculated by finely moving a target having a size smaller than a size equivalent to one pixel shown in FIGS. 5A and 5B in the X axis positive direction, the X axis negative direction, the Y axis positive direction, and the Y axis positive direction as shown in FIGS. 5A and 5B.

In the sensitivity map shown in FIG. 9, an image area corresponding to a sensitivity area $S_H$ includes a position equivalent to the target 6 in the left figure of FIG. 5A, i.e., a position with high sensitivity. In the sensitivity map shown in FIG. 9, an area corresponding to a sensitivity area $S_L$ includes a position equivalent to the target 6 in the left figure of FIG. 5B, i.e., a position with low sensitivity.

Referring back to FIG. 8, the goal-position adjusting unit 33 captures the information concerning the moving direction and the moving amount of the target supplied from the sensitivity-map generating unit 32. The goal-position adjusting unit 33 generates, according to the information concerning the moving direction and the moving amount of the target, a Cartesian coordinate robot control command having content including an instruction for moving the target and supplies the Cartesian coordinate robot control command to the robot control device 50.

The goal-position adjusting unit 33 captures position information of the goal position supplied from the goal-position determining unit 34, generates, according to the position information, a Cartesian coordinate robot control command having content including an instruction for moving the target, and supplies the Cartesian coordinate robot control command to the robot control device 50.

The goal-position adjusting unit 33 captures a Cartesian coordinate robot control status supplied from the robot control device 50. When the content of the Cartesian coordinate robot control status is content representing success of control, the goal-position adjusting unit 33 supplies an image pickup request command to the image pickup device 20.

The goal-position determining unit 34 selects a goal position on the basis of the sensitivity map generated by the sensitivity-map generating unit 32. For example, the goal-position determining unit 34 detects a position with a largest sensitivity value in the sensitivity map or extracts plural areas of sensitivity values exceeding a sensitivity threshold determined in advance and detects a center position of an area present on the innermost side of the areas to thereby select the detected position as a goal position. The goal-position determining unit 34 supplies position information of the goal position to the goal-position adjusting unit 33. For example, in the sensitivity map shown in FIG. 9, the goal-position determining unit 34 determines a center position of an area corresponding to the sensitivity area $S_H$ as a goal position and supplies position information of the goal position to the goal-position adjusting unit 33.

After supplying the position information of the goal position to the goal-position adjusting unit 33, the goal-position determining unit 34 generates a goal image storage control signal for storing goal image data and supplies the goal image storage control signal to the goal-image storing unit 36.

The goal-image storing unit 36 stores in advance goal image data, which is an image in a state in which the position of the target coincides with the goal position at the pixel level. For example, the goal-image storing unit 36 stores in advance goal image data in a state in which the shaft hole 221 of the spur gear is provided in a position where the center of the shaft hole 221 of the spur gear coincides with the shaft center of the shaft 210.

In the execution of the goal image generation processing by the position detecting device 30, when the goal-image storing unit 36 captures the goal image storage control signal supplied from the goal-position determining unit 34, the goal-image storing unit 36 captures and stores image data supplied from the image-data acquiring unit 31. The image data at this point is data of a goal image in a state in which the target is arranged in a position with high sensitivity.

In the rough adjustment mode, the target detecting unit 37 captures image data (target image data) supplied from the image-data acquiring unit 31 and reads the goal image data from the goal-image storing unit 36. The target detecting unit 37 executes template matching processing for a goal image and a target image, detects the target from the target image, and acquires a coordinate value (xp, yp) of a reference position of the detected target. For example, the target detecting unit 37 searches for, while shifting a partial image including the target in the goal image pixel by pixel on the target image, a place where a pattern coincides with the target. When the target detecting unit 37 detects the place where the pattern coincides with the target, the target detecting unit 37 acquires the coordinate value (xp, yp) of the reference position of the target in the place. Specifically, when the target is the shaft hole 221 of the component 220, the target detecting unit 37 sets the center position of the shaft hole 221 as the reference position (xp, yp) and supplies the coordinate value (xp, yp) of the reference position and a coordinate value (xo, yo) of a reference position of the target in the goal image to the target-position adjusting unit 38.

In the fine adjustment mode, the target detecting unit 37 reads goal image data from the goal-image storing unit 36 and captures image data (target image data) sequentially supplied from the image-data acquiring unit 31. The target detecting unit 37 calculates, for each of the captured image data, a coincidence evaluation value of an image of the image data (a target image) and a goal image. When the coincidence evaluation value is equal to or smaller than a threshold, the target detecting unit 37 determines that the target does not coincide with the goal image at the sub-pixel level and supplies a search continuation signal to the target-position adjusting unit 38. The target detecting unit 37 calculates a density gradient on the basis of pixel values of one pixel before and one pixel after the goal image by applying, for example, a Lucas-Kanade method, which is a publicly-known sub-pixel estimating method, and calculates a direction and a deviation amount of positional deviation of the target. When the coincidence evaluation value exceeds the threshold, the target detecting unit 37 determines that the target coincides with the goal image at accuracy of the sub-pixel level and supplies a search end signal to the target-position adjusting unit 38.

The target-position adjusting unit 38 captures the coordinate value (xp, yp) of the reference position of the target in the image data supplied from the target detecting unit 37 in the rough adjustment mode and the coordinate value (xo, yo) of the reference position of the target in the goal image data. The target-position adjusting unit 38 generates a multi-joint robot control command having content including an instruction for moving the target in a direction in which a difference value (xo-xp, yo-yp) between the coordinate value (xo, yo) of the reference position of the target in the goal image data and the coordinate value (xp, yp) of the reference position of the target in the image data is (0, 0) and supplies the multi-joint robot control command to the robot control device 50.

The target-position adjusting unit 38 captures the search continuation signal and the direction and the deviation amount of the positional deviation of the target or the search end signal supplied from the target detecting unit 37 in the fine adjustment mode. When the target-position adjusting unit 38 captures the search continuation signal, the target-position adjusting unit 38 generates, on the basis of the direction and the deviation amount of the positional deviation of the target, a multi-joint robot control command having content including an instruction for finely moving the target and supplies the multi-joint robot control command to the robot control device 50. When the target-position adjusting unit 38 captures the search end signal, the target-position adjusting unit 38 ends the control by the robot control device 50.

The target-position adjusting unit 38 captures the multi-joint robot control status supplied from the robot control device 50. When the content of the multi-joint robot control status is content representing success of control, the target-position adjusting unit 38 supplies an image pickup request command to the image pickup device 20.

The operation of the robot apparatus 1 according to this embodiment is explained separately concerning the goal image generation processing and the target detection processing.

First, the operation of the goal image generation processing by the robot apparatus 1 is explained. The goal image generation processing by the robot apparatus 1 is executed in the assembly and manufacture line shown in FIG. 2 in a state in which the assembly component with the component 220 attached to the shaft 210 on the base 200 is provided in the Cartesian coordinate robot 60.

Figure 10:
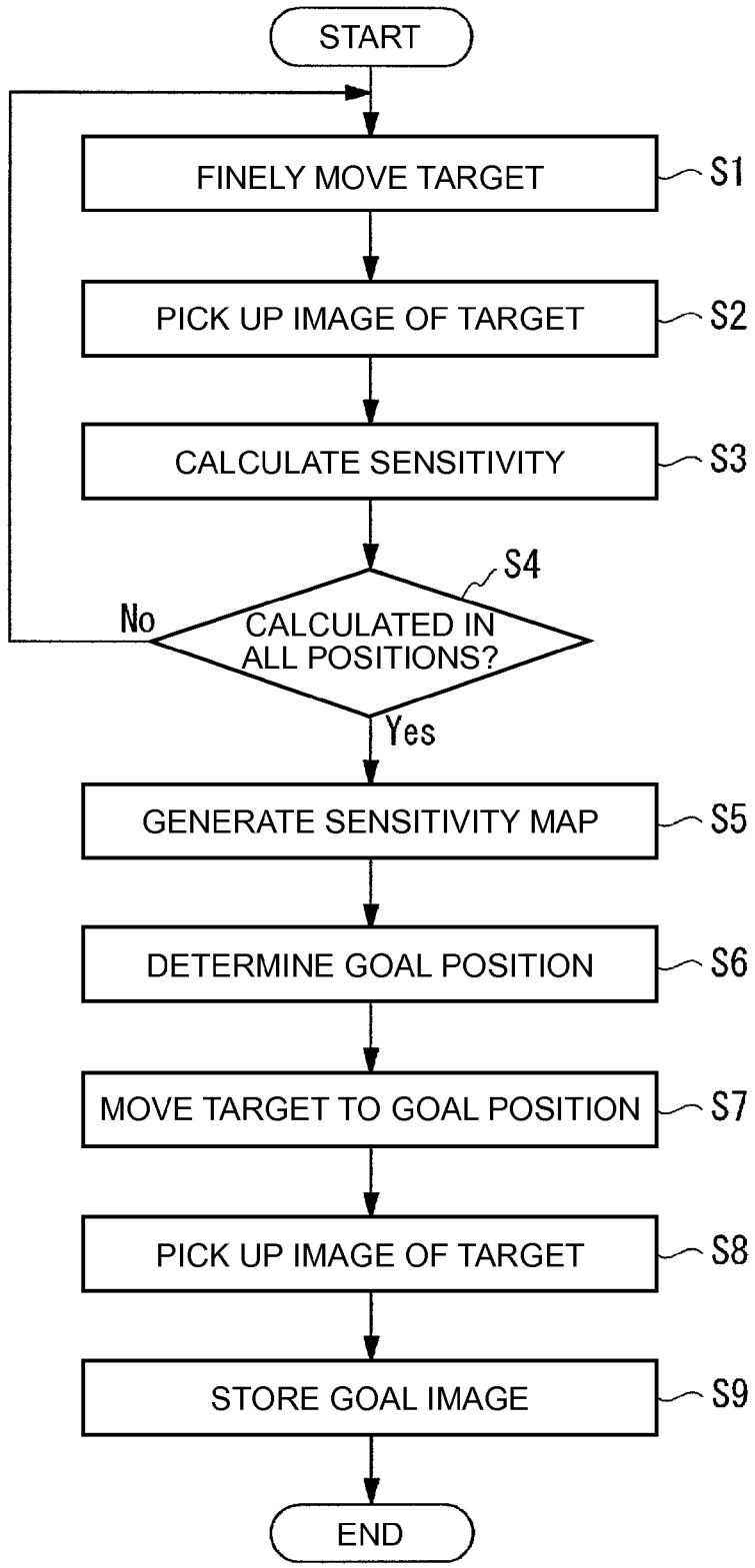
FIG. 10 is a flowchart for explaining a processing procedure of goal image generation processing by the robot apparatus according to the embodiment.

FIG. 10 is a flowchart for explaining a processing procedure of the goal image generation processing by the robot apparatus 1. As processing at a pre-stage of the start of the processing according to the flowchart of FIG. 10, the position detecting device 30 causes the image pickup device 20 to pick up an image of the shaft hole 221 of the component 220, which is the target, acquires image data (reference image data) obtained by the image pickup, and causes the sensitivity-map generating unit 32 to store the image data.

First, in step S1, the sensitivity-map generating unit 32 supplies information concerning a moving direction and a moving amount of the target to the goal-position adjusting unit 33. The moving direction of the target is, for example, the horizontal left direction, the horizontal right direction, the vertical upward direction, or the vertical downward direction of an image. The moving amount of the target is, for example, a distance equivalent to 0.1 pixel. The sensitivity-map generating unit 32 performs control to finely displace the target stepwise concerning the respective moving directions.

Subsequently, the goal-position adjusting unit 33 captures the information concerning the moving direction and the moving amount of the target supplied from the sensitivity-map generating unit 32. The goal-position adjusting unit 33 generates, according to the information concerning the moving direction and the moving amount of the target, a Cartesian coordinate robot control command having content including an instruction for moving the target and supplies the Cartesian coordinate robot control command to the robot control device 50.

The robot control device 50 captures the Cartesian coordinate robot control command supplied from the position detecting device 30 and controls the movement of one or both of the two shaft modules of the Cartesian coordinate robot 60 on the basis of the Cartesian coordinate robot control command. Consequently, the Cartesian coordinate robot 60 moves the two shaft modules individually or in coordination with each other according to the control by the robot control device 50.

After controlling the Cartesian coordinate robot 60, the robot control device 50 supplies a Cartesian coordinate robot control status including information indicating whether the control is successful to the position detecting device 30.

The goal-position adjusting unit 33 captures the Cartesian coordinate robot control status supplied from the robot control device 50. When the content of the Cartesian coordinate robot control status is content representing success of the control, the goal-position adjusting unit 33 supplies an image pickup request command to the image pickup device 20.

In step S2, when the image pickup device 20 captures the image pickup request command supplied from the goal-position adjusting unit 33, the image pickup device 20 picks up an image of the target and supplies image data obtained by the image pickup to the position detecting device 30. In the position detecting device 30, the image-data acquiring unit 31 acquires the image data supplied from the image pickup device 20 and supplies the image data to the sensitivity-map generating unit 32.

In step S3, the sensitivity-map generating unit 32 calculates sensitivity on the basis of the reference image data stored in the pre-processing and the image data supplied by the processing in step S2 and stores a result of the calculation. Specifically, the sensitivity-map generating unit 32 obtains, as a sensitivity value, a value obtained by dividing a luminance difference between the reference image data and the image data by a moving distance of the target and stores the sensitivity value.

When the sensitivity-map generating unit 32 completes the calculation of sensitivity values in all positions to which the target is displaced stepwise in each of the moving directions (YES in step S4), the processing shifts to processing in step S5. Otherwise (NO in step S4), the processing returns to the processing in step S1.

In step S5, the sensitivity-map generating unit 32 generates a sensitivity map in which stored sensitivity values are associated with positions on the image.

In step S6, the goal-position determining unit 34 selects a goal position on the basis of the sensitivity map generated by the sensitivity-map generating unit 32 and supplies position information of the goal position to the goal-position adjusting unit 33.

In step S7, the goal-position adjusting unit 33 captures the position information of the goal position supplied from the goal-position determining unit 34, generates, according to the position information, a Cartesian coordinate robot control command having content including an instruction for moving the target, and supplies the Cartesian coordinate robot control command to the robot control device 50.

The robot control device 50 captures the Cartesian coordinate robot control command supplied from the position detecting device 30 and controls, on the basis of the Cartesian coordinate robot control command, the movement of one or both of the two shaft modules of the Cartesian coordinate robot 60. Consequently, the Cartesian coordinate robot 60 moves the two shaft modules individually or in coordination with each other according to the control by the robot control device 50.

After controlling the Cartesian coordinate robot 60, the robot control device 50 supplies a Cartesian coordinate robot control status including information indicating whether the control is successful to the position detecting device 30.

The goal-position adjusting unit 33 captures the Cartesian coordinate robot control status supplied from the robot control device 50. When the content of the Cartesian coordinate robot control status is content representing success of the control, the goal-position adjusting unit 33 supplies an image pickup request command to the image pickup device 20.

In step S8, when the image pickup device 20 captures the image pickup request command supplied from the goal-position adjusting unit 33, the image pickup device 20 picks up an image of the target and supplies image data obtained by the image pickup to the position detecting device 30. In the position detecting device 30, the image-data acquiring unit 31 acquires image data supplied from the image pickup device 20 and supplies the image data to the goal-image storing unit 36.

In step S9, the goal-position determining unit 34 generates a goal image storage control signal for storing goal image data and supplies the goal image storage control signal to the goal-image storing unit 36.

The goal-image storing unit 36 stores, on the basis of the goal image storage control signal, the image data supplied from the image-data acquiring unit 31.

The operation of the target detection processing by the robot apparatus 1 is explained. The target detection processing by the robot apparatus 1 is executed, after the goal image generation processing is executed, in a state in which the assembly component with the component 220 not assembled to the shaft 210 on the base 200 is provided in the Cartesian coordinate robot 60 in the assembly and manufacture line shown in FIG. 2.

Figure 11:
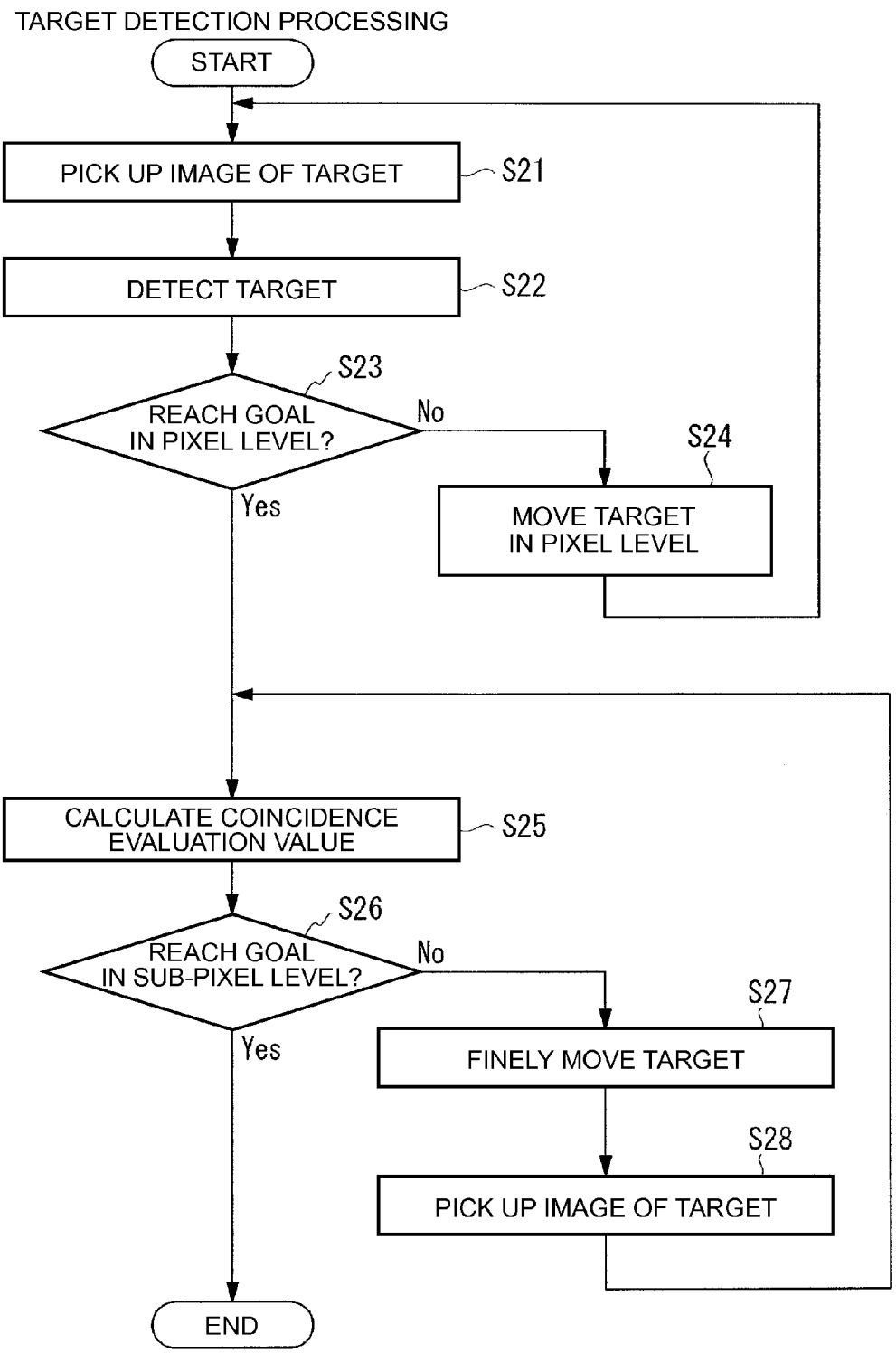
FIG. 11 is a flowchart for explaining a processing procedure of target detection processing by the robot apparatus according to the embodiment.

FIG. 11 is a flowchart for explaining a processing procedure of the target detection processing by the robot apparatus 1. After the position detecting device 30 is set in the rough adjustment mode, the processing of the flowchart of FIG. 11 is started.

First, in step S21, the image pickup device 20 picks up an image of a target and an assembly component to be assembled and supplies image data obtained by the image pickup to the position detecting device 30. In the position detecting device 30, the image-data acquiring unit 31 acquires the image data supplied from the image pickup device 20 and supplies the image data to the target detecting unit 37.

In step S22, according to template matching processing of an image, for example, a search area of which is the entire image, the target detecting unit 37 detects the target from the image.

Processing in step S22 is explained in detail.

First, the target detecting unit 37 captures the image data supplied from the image-data acquiring unit 31 and reads goal image data from the goal-image storing unit 36.

Subsequently, the target detecting unit 37 executes, in an image area of the image data, search processing for the target by a template matching method using the goal image data, detects the target, and acquires a coordinate value (xp, yp) of a reference position of the target.

The target detecting unit 37 supplies the coordinate value (xp, yp) of the reference position of the target in the image data and a coordinate value (xo, yo) of a reference position of the target in the goal image data to the target-position adjusting unit 38.

In step S23, the target-position adjusting unit 38 captures the coordinate value (xp, yp) of the reference position of the target in the image data and the coordinate value (xo, yo) of the reference position of the target in the goal image data supplied from the target detecting unit 37.

The target-position adjusting unit 38 calculates a difference value (xo-xp, yo-yp) between the coordinate value (xo, yo) of the reference position of the target in the goal image data and the coordinate value (xp, yp) of the reference position of the target in the image data.

When the difference value (xo-xp, yo-yp) is not (0, 0), the target-position adjusting unit 38 determines that the target does not reach the goal and the processing shifts to processing in step S24. When the difference value (xo-xp, yo-yp) is (0, 0), the target-position adjusting unit 38 determines that the target reaches the goal at position accuracy of the pixel level and switches the rough adjustment mode to the fine adjustment mode. The processing shifts to processing in step S25.

In step S24, the target-position adjusting unit 38 generates a multi-joint robot control command having content including an instruction for moving the target in a direction in which the difference value (xo-xp, yo-yp) is (0, 0) and supplies to the multi-joint robot control command to the robot control device 50.

The robot control device 50 captures the multi-joint robot control command supplied from the position detecting device 30. The robot control device 50 controls, on the basis of the multi-joint robot control command, the movement of any one of or a combination of the arm section 10b, the hand section 10c, and the gripping section 10d of the multi-joint robot 10. The multi-joint robot 10 moves, according to the control by the robot control device 50, any one of or a combination of the arm section 10b, the hand section 10c, and the gripping section 10d.

After controlling the multi-joint robot 10, the robot control device 50 supplies a multi-joint robot control status including information indicating whether the control is successful to the position detecting device 30.

The target-position adjusting unit 38 captures the multi-joint robot control status supplied from the robot control device 50. When the content of the multi-joint robot control status is content representing success of control, the target-position adjusting unit 38 supplies an image pickup request command to the image pickup device 20.

The processing returns to the processing in step S21.

On the other hand, in step S25, the target detecting unit 37 captures the image data (the target image data) supplied from the image-data acquiring unit 31.

The target detecting unit 37 calculates a coincidence evaluation value of captured target images and a goal image, for example, a sum of squares of luminance values of the target images and the goal image.

In step S26, when coincidence evaluation is equal to or smaller than a threshold, the target detecting unit 37 determines that the target does not coincide with the goal image at the sub-pixel level and supplies a search continuation signal to the target-position adjusting unit 38. The processing shifts to step S27. On the other hand, when the coincidence evaluation exceeds the threshold, the target detecting unit 37 determines that the target coincides with the goal image at the sub-pixel level and supplies a search end signal to the target-position adjusting unit 38. When the target-position adjusting unit 38 captures the search end signal, the target-position adjusting unit 38 ends the control by the robot control device 50 and ends the processing of the flowchart.

In step S27, the target detecting unit 37 reads the goal image data from the goal-image storing unit 36. The target detecting unit 37 calculates a density gradient on the basis of pixel values of one pixel before and one pixel after the goal image by applying, for example, the Lucas-Kanade method, calculates a direction and a deviation amount of positional deviation of the target, and supplies the direction and the deviation amount to the target-position adjusting unit 38.

The target-position adjusting unit 38 generates, on the basis of the direction and the shift amount of the positional deviation of the target, a multi-joint robot control command having content including an instruction for finely moving the target and supplies the multi-joint robot control command to the robot control device 50.

The robot control device 50 captures the multi-joint robot control command supplied from the position detecting device 30. The robot control device 50 controls, on the basis of the multi-joint robot control command, the movement of any one of or a combination of the arm section 10b, the hand section 10c, and the gripping section 10d of the multi-joint robot 10. The multi-joint robot 10 moves, according to the control by the robot control device 50, any one of or a combination of the arm section 10b, the hand section 10c, and the gripping section 10d.

After controlling the multi-joint robot 10, the robot control device 50 supplies a multi-joint robot control status including information indicating whether the control is successful to the position detecting device 30.

The target-position adjusting unit 38 captures the multi-joint robot control status supplied from the robot control device 50. When the content of the multi-joint robot control status is content representing success of the control, the target-position adjusting unit 38 supplies an image pickup request command to the image pickup device 20.

In step S28, when the image pickup device 20 captures the image pickup request command supplied from the target-position adjusting unit 38, the image pickup device 20 picks up an image of an assembly component and supplies image data, i.e., target image data obtained by the image pickup to the position detecting device 30. In the position detecting device 30, the image-data acquiring unit 31 acquires the image data supplies from the image pickup device 20 and supplies the image data to the target detecting unit 37.

The processing returns to the processing in step S25.

According to the first embodiment of the invention, the position detecting device 30 of the robot apparatus 1 generates goal image data in a state in which the goal position of the target is a position with high sensitivity and stores the goal image data. The position detecting device 30 calculates, while performing control for displacing the target by a displacement amount at the sub-pixel level, a coincidence evaluation value of the target of target images and a goal image and detects a point where the coincidence evaluation is the highest. The position detecting device 30 can cause the target to reach the goal position at precise sub-pixel accuracy by controlling the robot control device 50 to move the target to a position corresponding to the point.

Since the sensitivity map is generated, the position detecting device 30 can determine an appropriate goal position with high sensitivity according to a distribution of sensitivity of the target images.

Second Embodiment

In the example explained in the first embodiment, the size of the target is smaller than the size equivalent to one pixel of the image pickup system, specifically, the target is the fine shaft hole of the spur gear and the size of the shaft hole in the image pickup surface is smaller than the size equivalent to one pixel.

In an example explained below in a second embodiment of the invention, the size of the target is equal to or larger than the size equivalent to one pixel of the image pickup system, specifically, the target is the entire one spur gear and the size of the entire spur gear on the image pickup surface is equal to or larger than the size equivalent to one pixel.

A robot apparatus according to this embodiment applies weighting by a weight coefficient to a pixel according to sensitivity and stores the weight coefficient and a sensitivity map in association with each other. The robot apparatus selects, from the sensitivity map associated with the weight coefficient, plural pixels used for alignment on the basis of weight and performs alignment at a sub-pixel level using the selected plural pixels.

A configuration diagram of the robot apparatus according to this embodiment is the same as the configuration diagram of the robot apparatus 1 according to the first embodiment. A flowchart of processing by the robot apparatus according to this embodiment is the same as the flowchart of the processing of the robot apparatus 1 according to the first embodiment. Therefore, in this embodiment, the configuration diagram and the flowchart of the robot apparatus are omitted. Only differences from the first embodiment are explained.

Figure 12:
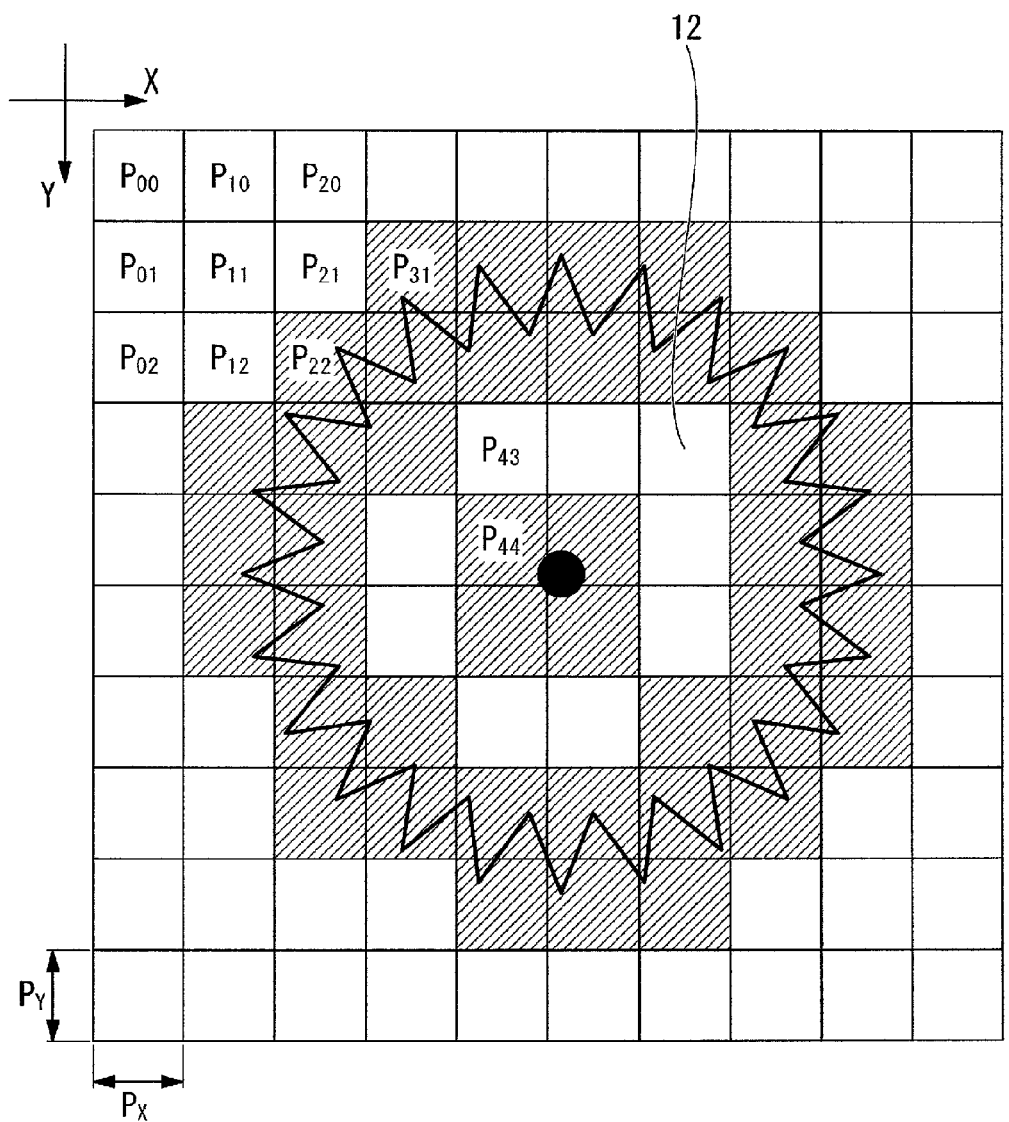
FIG. 12 is a diagram for explaining the sensitivity of an image picked up when the size of a target is equal to or larger than a size equivalent to one pixel of an image pickup system in a second embodiment and modifications of the invention.

FIG. 12 is a diagram for explaining the sensitivity of an image picked up when the size of a target is equal to or larger than a size equivalent to one pixel of an image pickup system. FIG. 12 is a diagram in which a target 12 and pixels $P_{00}$, $P_{10}$, $P_{20}$, ..., $P_{01}$, $P_{11}$, $P_{21}$, ... including an image of the target 12 are schematically shown to be superimposed one on top of the other. The target 12 is a spur gear viewed in a direction through a shaft hole.

Pixels (e.g., pixels $P_{22}$, $P_{31}$, and $P_{44}$) hatched in FIG. 12 are pixels, pixel values of which change when the target 12 is displaced in any one of the X axis positive direction, the X axis negative direction, the Y axis positive direction, and the Y axis negative direction by a displacement amount equivalent to a size smaller than one pixel. Sensitivity values of these pixels are positive values. On the other hand, pixels (e.g., pixels $P_{00}$, $P_{10}$, and $P_{43}$) not hatched in FIG. 12 are pixels, pixel values of which do not change even when the target 12 is displaced in any one of the X axis positive direction, the X axis negative direction, the Y axis positive direction, and the Y axis negative direction by the displacement amount equivalent to the size smaller than one pixel. Sensitivity values of these pixels are 0 (zero).

In this embodiment, the sensitivity-map generating unit 32 of the position detecting device 30 performs weighting corresponding to sensitivity values of pixels in generating a sensitivity map. Specifically, for example, the sensitivity-map generating unit 32 associates a weight coefficient "1" with pixels corresponding to positions where sensitivity values are positive values (e.g., the pixels hatched in FIG. 12) and associates a weight coefficient "0" with pixels corresponding to positions where sensitivity values are 0 (zero) (e.g., the pixels not hatched in FIG. 12).

The goal-position determining unit 34 selects plural goal position candidates on the basis of the sensitivity map generated by the sensitivity-map generating unit 32. For example, the goal-position determining unit 34 extracts, from the sensitivity map, plural areas having sensitivity values exceeding a sensitivity threshold determined in advance and selects the extracted plural areas as goal position candidates. The goal-position determining unit 34 supplies position information of the goal position candidates to the goal position adjusting unit 33.

The goal-position adjusting unit 33 captures position information of the goal position candidates supplied from the goal-position determining unit 34, generates a Cartesian coordinate robot control command having content including an instruction for moving the target on the basis of these kinds of position information, and supplies the Cartesian coordinate robot control command to the robot control device 50.

In calculation processing for a coincidence evaluation value of the target based on image data captured from the image-data acquiring unit 31 and goal image data read from the goal-image storing unit 36, the target detecting unit 37 selects pixels used for the calculation processing according to the weights of the pixels. Specifically, the target detecting unit 37 executes the calculation processing for a coincidence evaluation value using only the pixels, the weight coefficient of which is "1". Consequently, the weight coefficient of the pixels that does not change when the target moves can be set to "0". Therefore, it is possible to suppress the influence due to noise and a background image.

As explained above, according to the second embodiment of the invention, by applying a weight coefficient corresponding to sensitivity, it is possible to perform image comparison while suppressing the influence due to noise and a background image and perform highly reliable alignment at the sub-pixel level.

First Modification in the Second Embodiment

In a first modification of the second embodiment of the invention, the sensitivity-map generating unit 32 of the position detecting device 30 associates a weight coefficient, which increases as a sensitivity value increases, with a pixel. For example, the sensitivity-map generating unit 32 associates, with the pixel, a weight coefficient in a range of 0 to 1 corresponding to an average of sensitivity values in positions included in an area corresponding to the pixel.

In calculation processing for a coincidence evaluation value of a target based on image data captured from the image-data acquiring unit 31 and goal image data read from the goal-image storing unit 36, the target detecting unit 37 selects pixels used for the calculation processing according to the weights of the pixels. Specifically, the target detecting unit 37 executes the calculation processing for a coincidence evaluation value using only pixels, weight coefficients of which are values exceeding a predetermined threshold.

By applying weight corresponding to sensitivity in this way, it is possible to perform image comparison while suppressing the influence due to noise and a background image and perform highly reliable alignment in at sub-pixel accuracy.

Second Modification in the Second Embodiment

In a second modification of the second embodiment of the invention, the sensitivity-map generating unit 32 of the position detecting device 30 generates a sensitivity map for each direction of displacement of a target. The sensitivity-map generating unit 32 associates, for each direction of displacement of the target, a weight coefficient, which increases as a sensitivity value increases, with a pixel. For example, the sensitivity-map generating unit 32 associates, for each direction of displacement of the target, with the pixel, a weight coefficient in a range of 0 to 1 corresponding to an average of sensitivity values in positions included in an area corresponding to the pixel. Specifically, when sensitivity maps are generated respectively for the X axis positive direction, the X axis negative direction, the Y axis positive direction, and the Y axis negative direction, the sensitivity-map generating unit 32 associates four kinds of weight coefficients with pixels.

In calculation processing for a coincidence evaluation value of the target based on image data captured from the image-data acquiring unit 31 and goal image data read from the goal-image storing unit 36, the target detecting unit 37 selects, for each direction of displacement of the target, pixels used for the calculation processing according to the weights of the pixels. Specifically, the target detecting unit 37 executes the calculation processing for a coincidence evaluation value using only the pixels, the weight coefficient of which is a value exceeding a predetermined threshold.

By applying weight corresponding to sensitivity for each direction of displacement of the target in this way, it is possible to suppress variation of alignment accuracy due to the shape and the moving direction of the target and perform highly reliable alignment in at sub-pixel accuracy.

The first embodiment, the second embodiment, and the modifications of the second embodiment are examples in which the assembly component is finely moved by the Cartesian coordinate robot 60. As means for moving the assembly component with respect to the image pickup surface of the image pickup device 20, a multi-joint robot may be used other than the Cartesian coordinate robot 60. The assembly component may be fixed and the image pickup device 20 may be moved using a Cartesian coordinate robot or a multi-joint robot.

A part of the functions of the position detecting device 30 in the embodiments may be realized by a computer. In this case, a position detecting program for realizing the control functions may be recorded in a computer-readable recording medium. The control functions may be realized by causing a computer system to read the position detecting program recorded in the recording medium and executing the position detecting program. The "computer system" includes an OS (Operating System) and hardware of peripheral equipment. The "computer-readable recording medium" means a portable recording medium such as a flexible disk, a magneto-optical disk, an optical disk, or a memory card or a storage device such as a magnetic hard disk incorporated in the computer system. Further, the "computer-readable recording medium" may include a medium that dynamically stores a computer program for a short time such as a communication line in transmitting the computer program via a network such as the Internet or a telecommunication line such as a telephone line or a medium that stores the computer program for a fixed time such as a volatile memory on the inside of the computer system functioning as a server apparatus or a client in transmitting the computer program. The computer program may be a computer program for realizing a part of the functions or may be a computer program for realizing the functions according to combination with a computer program already recorded in the computer system.

The embodiments of the invention are explained in detail with reference to the drawings. However, a specific configuration is not limited to the embodiments and includes design and the like in a range not departing from the spirit of the invention.

The entire disclosure of Japanese Patent Application No. 2011-027233, filed Feb. 10, 2011 is expressly incorporated by reference herein.

What is claimed is:

1. A position detecting method comprising:
   allowing a target detecting unit to
   calculate, by a computer, according to sensitivity represented by an amount of change of a pixel value at the time when a target aligned with a goal position in image data at a pixel level is displaced by a displacement amount at a sub-pixel level, a coincidence evaluation value of the target on the basis of comparison of goal image data in a state in which the target is arranged and image data including images of the target; and
   detect positional deviation of the target with respect to the goal position on the basis of the calculated coincidence evaluation value.

2. A position detecting program on a non-transitory computer-readable medium for causing a computer, which includes a goal-image storing unit that stores, according to sensitivity represented by an amount of change of a pixel value at the time when the target aligned with a goal position in image data at a pixel level is displaced by a displacement amount at a sub-pixel level, goal image data in a state in which the target is arranged, to execute:
   a calculation step of calculating a coincidence evaluation value of the target on the basis of comparison of image data including images of the target and the goal image data stored by the goal-image storing unit; and
   a detecting step of detecting positional deviation of the target with respect to the goal position on the basis of the calculated coincidence evaluation value.

3. A position detecting device comprising:
   a goal-image storing unit that stores, according to sensitivity represented by an amount of change of a pixel value at the time when a target aligned with a goal position in image data at a pixel level is displaced by a displacement amount at a sub-pixel level, goal image data in a state in which the target is arranged; and
   a target detecting unit that calculates a coincident evaluation value of the target on the basis of comparison of image data including an image of the target and the goal image data stored by the goal-image storing unit and detects positional deviation of the target with respect to the goal position on the basis of the coincidence evaluation value.

4. A robot apparatus comprising:
   a conveying robot that holds a target to be conveyable to a goal position;
   an image pickup unit that picks up an image of the goal position and the target included in a field of view and generates image data;

a goal-image storing unit that stores, according to sensitivity represented by an amount of change of a pixel value at a time when the target aligned with the goal position in the image data at a pixel level is displaced by a displacement amount at a sub-pixel level, goal image data in a state in which the target is arranged;

a target detecting unit that calculates a coincident evaluation value of the target on the basis of comparison of the image data including the image of the target, which is held by the conveying robot, generated by the image pickup unit and the goal image data stored by the goal-image storing unit and detects positional deviation of the target with respect to the goal position on the basis of the coincidence evaluation value; and a conveying-robot control unit that controls the conveying robot to convey the target held by the conveying robot in a direction in which the positional deviation detected by the target detecting unit is eliminated.

5. The robot apparatus according to claim 4, further comprising:

a position changing robot that changes relative positions on the image data of the target aligned in the goal position at the pixel level and the image pickup unit;

a sensitivity-map generating unit that calculates a distribution of the sensitivity on the basis of image data including an image of the target displaced by the position changing robot and generates a sensitivity map in which the distribution is associated with a position on the image data;

a goal-position determining unit that determines a goal position in the image data on the basis of the sensitivity map generated by the sensitivity-map generating unit; and a position-changing-robot control unit that controls the position changing robot to move the target to the goal position determined by the goal-position determining unit, wherein when the target detecting unit detects the positional deviation, the target detecting unit calculates a direction and a deviation amount of the positional deviation of the target according to sub-pixel estimation processing, and the conveying-robot control unit controls, on the basis of the direction and the deviation amount of the positional deviation of the target, the conveying robot to convey the target held by the conveying robot.

6. The robot apparatus according to claim 4, wherein the target detecting unit calculates a total sum of absolute values of luminance differences between the image data and the goal image data or a sum of squares of the luminance differences and obtains the coincidence evaluation value.

7. The robot apparatus according to claim 4, wherein the conveying robot includes a movable arm section and a movable hand section coupled to the arm section and causes the hand section to hold the target.

8. The robot apparatus according to claim 5, wherein the sensitivity-map generating unit weighs pixels with a weight coefficient according to the sensitivity and associates the weight coefficient and the sensitivity map, and the target detecting unit selects a pixel used for calculation processing for the coincidence evaluation value on the basis of the weight coefficient of the pixels.

9. The robot apparatus according to claim 5, wherein, in a state in which one of the target and the image pickup unit is fixed, the position changing robot movably supports the other.

10. The robot apparatus according to claim 8, wherein the weight coefficient increases in value as the sensitivity increases, and the target detecting unit selects the pixel used for the calculation processing for the coincidence evaluation value using only pixels, the weight coefficient of which has a value exceeding a threshold.

* * * * *